(12) United States Patent
Sakane

(10) Patent No.: US 9,060,129 B2
(45) Date of Patent: Jun. 16, 2015

(54) IMAGING DEVICE, CONTROL METHOD OF IMAGING DEVICE, AND COMPUTER PROGRAM

(71) Applicant: Sony Corporation, Tokyo (JP)

(72) Inventor: Seijiro Sakane, Tokyo (JP)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 13/848,320

(22) Filed: Mar. 21, 2013

(65) Prior Publication Data

US 2013/0258159 A1 Oct. 3, 2013

(30) Foreign Application Priority Data

Apr. 2, 2012 (JP) ................................. 2012-083700

(51) Int. Cl.
*H04N 5/232* (2006.01)

(52) U.S. Cl.
CPC ....... *H04N 5/23293* (2013.01); *H04N 5/23212* (2013.01); *H04N 5/23219* (2013.01); *H04N 5/23222* (2013.01)

(58) Field of Classification Search
CPC .......... H04N 5/23212; H04N 5/23219; H04N 5/23222; H04N 5/23293
USPC ............................ 348/333.01–333.04, 333.11
See application file for complete search history.

(56) References Cited

U.S. PATENT DOCUMENTS

| | | | |
|---|---|---|---|
| 6,606,117 B1 * | 8/2003 | Windle .......................... | 348/239 |
| 6,806,906 B1 * | 10/2004 | Soga et al. ............... | 348/333.03 |
| 7,239,350 B2 * | 7/2007 | Ban .......................... | 348/333.02 |
| 7,317,485 B1 * | 1/2008 | Miyake et al. ........... | 348/333.02 |
| 7,460,782 B2 * | 12/2008 | Chan et al. .................... | 396/281 |
| 7,973,848 B2 * | 7/2011 | Koh .......................... | 348/333.02 |
| 8,081,230 B2 * | 12/2011 | Jiang .......................... | 348/222.1 |
| 8,111,315 B2 * | 2/2012 | Uchida ..................... | 348/333.02 |
| 8,228,399 B2 * | 7/2012 | Hwang et al. ............ | 348/231.99 |
| 8,531,576 B2 * | 9/2013 | Kasahara et al. ......... | 348/333.02 |
| 8,675,089 B2 * | 3/2014 | Tauchi ....................... | 348/222.1 |
| 8,704,929 B2 * | 4/2014 | Imai .......................... | 348/333.01 |
| 8,743,230 B2 * | 6/2014 | Kim .......................... | 348/222.1 |
| 2008/0273097 A1 * | 11/2008 | Nagashima .............. | 348/231.99 |
| 2009/0102942 A1 * | 4/2009 | Yoshizumi et al. ........ | 348/222.1 |
| 2009/0256933 A1 * | 10/2009 | Mizukami .................. | 348/240.1 |
| 2010/0231741 A1 | 9/2010 | Suzuki | |

FOREIGN PATENT DOCUMENTS

JP 2010-213030 A 9/2010

\* cited by examiner

*Primary Examiner* — Timothy J Henn
(74) *Attorney, Agent, or Firm* — Hazuki International, LLC

(57) ABSTRACT

There is provided an imaging device including a control unit that performs subject recognition. The control unit recognizes a first subject, decides a first subject recommendation position for the first subject in a screen from among a plurality of subject recommendation positions, displays a first specific display object at the decided first subject recommendation position, determines whether a distance between a position of the first subject and the first subject recommendation position is within a predetermined value, and decides a second subject recommendation position for a second subject in the screen from among the plurality of subject recommendation positions and displays a second specific display object at the second subject recommendation position when the distance is within the predetermined value.

10 Claims, 13 Drawing Sheets

IMAGING DEVICE, CONTROL METHOD OF IMAGING DEVICE, AND COMPUTER PROGRAM

CROSS-REFERENCE TO RELATED APPLICATION

The present application claims priority from Japanese Patent Application No. JP 2012-083700 filed in the Japanese Patent Office on Apr. 2, 2012, the entire content of which is incorporated herein by reference.

BACKGROUND

The present disclosure relates to an imaging device, a control method of the imaging device, and a computer program.

There is an imaging device that detects a subject before photographing, and causes the subject to be photographed at a specific position in an image, and thereby can photograph with a balanced composition. For example, JP 2010-213030A discloses an imaging device that specifies a recommendation composition recommended based on a position at which a specific subject is present in a photographic image, and notifies a photographer of the recommendation composition. Also, there is an imaging device on a screen of which a photographer causes an auxiliary line to be displayed in advance, so that the photographer can photograph with a balanced composition by photographing according to the auxiliary line.

SUMMARY

When a recommendation composition is decided and a photographer is notified of the recommendation composition, it is difficult to set a subject according to the composition, and in short-time photography, it is troublesome for a photographer to cause an operation of displaying an auxiliary line to be performed in detail. In photographing, it is preferred to facilitate the photographing with a balanced composition.

Thus, the present disclosure is directed to provide a new and improved imaging device, control method of the imaging device, and computer program that facilitate photography with a balanced composition.

According to an embodiment of the present disclosure, there is provided an imaging device including a control unit that performs subject recognition. The control unit recognizes a first subject, decides a first subject recommendation position for the first subject in a screen from among a plurality of subject recommendation positions, displays a first specific display object at the decided first subject recommendation position, determines whether a distance between a position of the first subject and the first subject recommendation position is within a predetermined value, and decides a second subject recommendation position for a second subject in the screen from among the plurality of subject recommendation positions and displays a second specific display object at the second subject recommendation position when the distance is within the predetermined value.

According to such a configuration, the control unit performs subject recognition. The control unit recognizes a first subject, decides a first subject recommendation position for the first subject in a screen from among a plurality of subject recommendation positions to display a first specific display object at the decided first subject recommendation position. Also, the control unit determines whether a distance between a position of the first subject and the first subject recommendation position is within a predetermined value, decides a second subject recommendation position for a second subject in the screen from among the plurality of subject recommendation positions to display a second specific display object at the second subject recommendation position when the distance is within the predetermined value. As a result, such an imaging device is able to facilitate photographing with a balanced composition.

Further, according to an embodiment of the present disclosure, there is provided a method for controlling an imaging device including recognizing a first subject, deciding a first subject recommendation position for the first subject in a screen from among a plurality of subject recommendation positions to displaying a first specific display object at the first subject recommendation position, determining whether a distance between a position of the first subject and the first subject recommendation position is within a predetermined value, and when the distance is within the predetermined value, deciding a second subject recommendation position for a second subject in the screen from among the plurality of subject recommendation positions to display a second specific display object at the second subject recommendation position.

According to an embodiment of the present disclosure, there is provided a computer program for causing a computer to perform recognizing a first subject, deciding a first subject recommendation position for the first subject in a screen from among a plurality of subject recommendation positions to display a first specific display object at the first subject recommendation position determining whether a distance between a position of the first subject and the first subject recommendation position is within a predetermined value, and when the distance is within the predetermined value, deciding a second subject recommendation position for a second subject in the screen from among the plurality of subject recommendation positions to display a second specific display object at the second subject recommendation position.

According to the embodiments of the present disclosure described above, it is possible to provide a new and improved imaging device, control method of the imaging device, and computer program that facilitate photographing with a balanced composition.

DETAILED DESCRIPTION OF THE EMBODIMENT(S)

Figure 1:
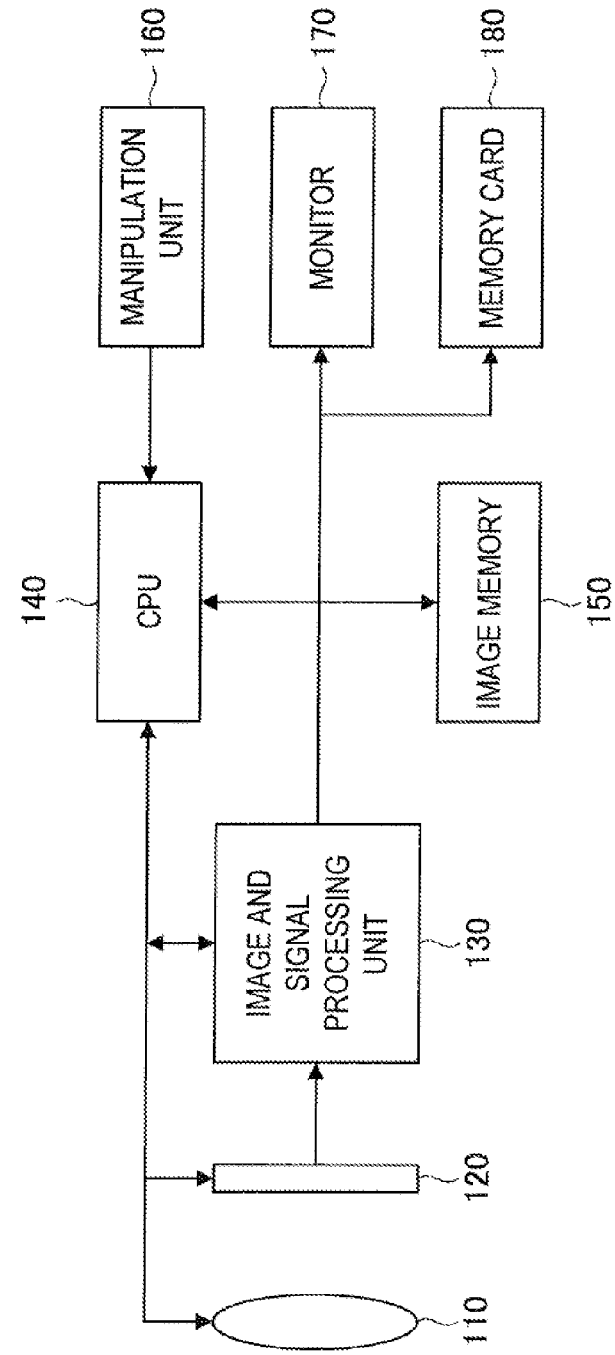
FIG. 1 is an explanatory diagram showing a configuration of an imaging device according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Descriptions will be made in the following order.
<1. Embodiment of Present Disclosure>
  [Configuration of Imaging Device]
  [Operation of Imaging Device]
<2. Conclusion>
<1. Embodiment of Present Disclosure>

First, a configuration of an imaging device according to an embodiment of the present disclosure will be described. FIG. 1 is an explanatory diagram showing a configuration of an imaging device 100 according to an embodiment of the present disclosure. The configuration of the imaging device 100 according to an embodiment of the present disclosure will be described below with reference to FIG. 1.

As shown in FIG. 1, the imaging device 100 according to an embodiment of the present disclosure is configured to include a lens unit 110, an imaging element 120, an image and signal processing unit 130, a CPU (Central Processing Unit) 140, an image memory 150, a manipulation unit 160, a monitor 170, and a memory card 180.

The lens unit 110 is an optical lens for forming an image of a subject by focusing light. The lens unit 110 may be configured to include a zoom lens and a focus lens. The imaging element 120 is a photoelectric element that converts the light focused by the lens unit 110 into an electric signal. In the imaging element 120, a semiconductor element, for example, a CCD (Charge Coupled Device) image sensor, a CMOS (Complementary Metal Oxide Semiconductor) image sensor, or the like, is used. The imaging element 120 supplies the electric signal to the image and signal processing unit 130.

The image and signal processing unit 130 generates image data by performing a signal process on the electric signal supplied from the imaging element 120, and performs an image process on the generated image data. More specifically, the image and signal processing unit 130 generates image data by converting the electric signal supplied from the imaging element 120 into a digital signal, and performs a noise reduction process, a white balance adjustment, a gamma adjustment, and other image processes on the image data. Also, the image and signal processing unit 130 performs processes such as lens position correction for the lens unit 110, imager correction for the imaging element 120, a dynamic range expansion process, a process of detecting a face included in the image data, an electronic zoom process, an image stabilization process, automatic exposure control, and the like.

In addition, the image and signal processing unit 130 is an example of a control unit of the present disclosure, and performs a photography assist process, which will be described later, using a subject image obtained from the light focused by the lens unit 110 when a user of the imaging device 100 photographs an image.

The CPU 140 controls operation of the imaging device 100. For example, the CPU 140 performs a process of driving the lens unit 110, an imaging process using the lens unit 110 and the imaging element 120, a process of displaying an image on the monitor 170, and the like according to the user's manipulation through the manipulation unit 160. In addition, for example, the CPU 140 performs a process of displaying the image data generated by the image and signal processing unit 130 on the monitor 170 or storing the image data in the memory card 180.

The image memory 150 stores the image data generated by the image and signal processing unit 130. The image data stored in the image memory 150 is displayed on the monitor 170 or stored in the memory card 180 under control of the CPU 140. It is preferable for the image memory 150 to have capacity capable of storing the amount of image data corresponding to a plurality of frames.

The manipulation unit 160 is intended for various manipulations of the imaging device 100. The manipulation unit 160 is configured with, for example, a power button for turning on and off the power of the imaging device 100, a shutter button for photographing an image, a lever for driving the zoom lens and the focus lens constituting the lens unit 110, buttons for manipulating a variety of menu screens displayed on the monitor 170, and the like. Here, when a touch panel has been installed in the monitor 170, the touch panel may be switched to the buttons for manipulating the variety of menu screens so that the touch panel is caused to perform the function.

The monitor 170 displays the image data generated by the image and signal processing unit 130 or various menu screens for manipulating the imaging device 100. As the monitor 170, for example, a liquid crystal display, an organic electroluminescence display, or another flat panel display is used. In the monitor 170, a touch panel may be installed.

The memory card 180 stores the image data generated by a photography process of the imaging device 100. The image data stored in the memory card 180 is displayed on the monitor 170 by manipulation of the manipulation unit 160.

Thus far, a functional configuration of the imaging device 100 related to an embodiment of the present disclosure has been described with reference to FIG. 1. However, an imaging device of the present disclosure is not limited to such an example. Although FIG. 1 shows a configuration in which the lens unit 110 is included in the imaging device 100, an imaging device and a lens unit may be configured to be attachable to and detachable from each other. Also, in the description above, the image and signal processing unit 130 is an example of a control unit of the present disclosure, but the present disclosure is not limited to the related example. For example, the CPU 140 may have a function of a control unit of the present disclosure. Next, operation of the imaging device 100 related to an embodiment of the present disclosure will be described.

[Operation of Imaging Device]

Figure 2:
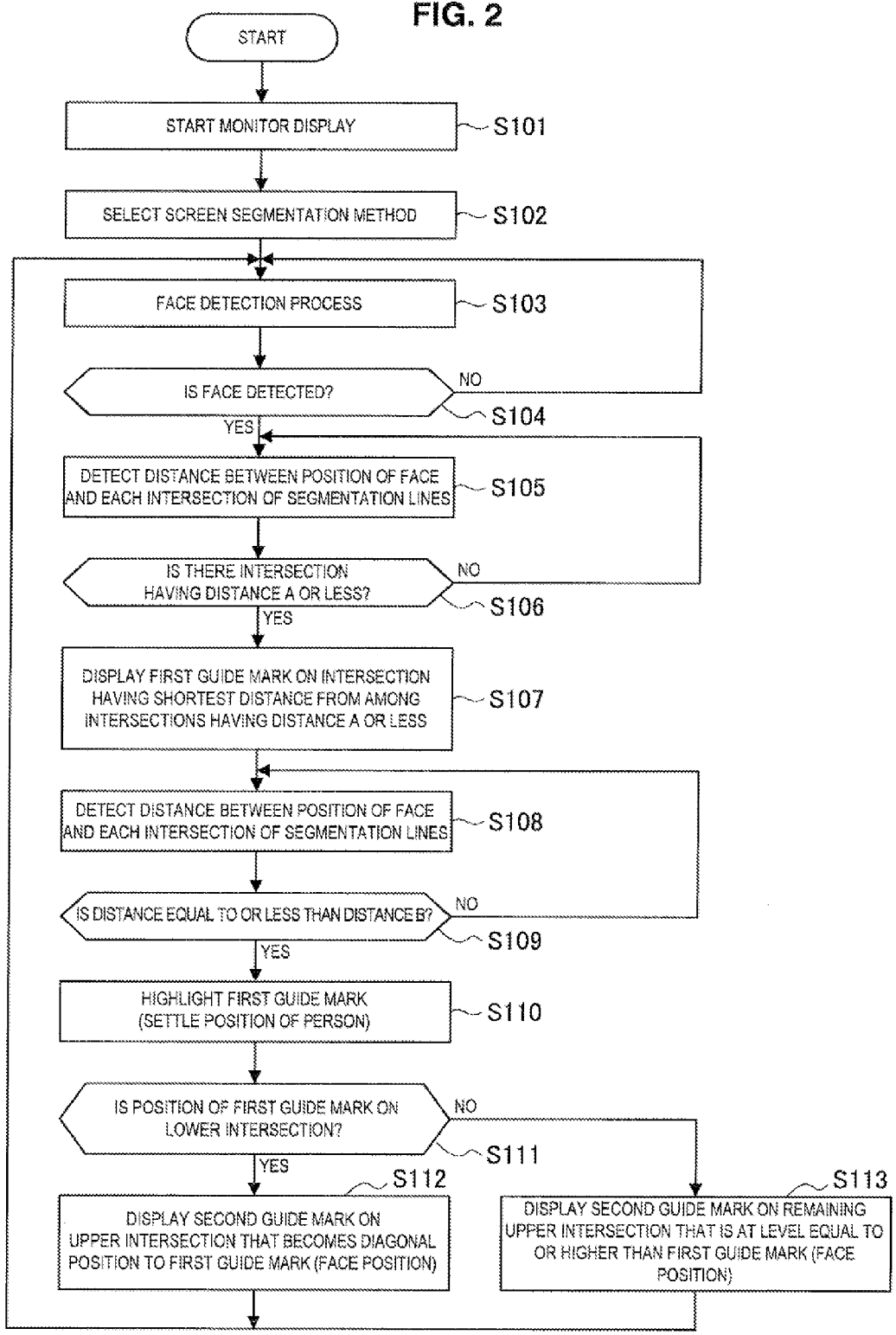
FIG. 2 is a flowchart illustrating operation of the imaging device related to an embodiment of the present disclosure.

FIG. 2 is a flowchart illustrating operation of the imaging device 100 related to an embodiment of the present disclosure. The flowchart shown in FIG. 2 illustrates a photography assist process when an image is photographed using the imaging device 100. Here, the photography assist process to be described below is performed by the image and signal processing unit 130 unless there is a specific notice, but the present disclosure is not limited to the related example. Operation of the imaging device 100 related to an embodiment of the present disclosure will be described below with reference to FIG. 2.

The imaging device 100 according to this embodiment performs a face detection process of determining whether a face is included in image data generated by the image and signal processing unit 130 using an electric signal that is obtained by the imaging element 120 from light focused by the lens unit 110. When a face is included in the image data, the imaging device 100 displays a predetermined mark at a position on the monitor 170 at which the detected face is balanced with a background from among a plurality of subject recommendation positions. A position that is balanced with a background is, for example, a position at which a subject such as a person or the like is present not to overlap the background and thus is balanced with the background. When a user moves the imaging device 100 to adjust the face of a subject to the mark, and a distance between the mark and the face becomes a predetermined distance or less, the imaging device 100 displays a predetermined mark at a recommendation position for the background on the monitor 170 from among the plurality of subject recommendation positions.

By performing such an operation of displaying a mark at a photography recommendation position, the imaging device 100 according to this embodiment can cause the user to readily photograph with a balanced composition between a subject and a background. Operation of the imaging device 100 according to this embodiment will be described in further detail below with reference to drawings.

When the imaging device 100 performs a photography assist process, the imaging device 100 first starts to display image data obtained from light focused by the lens unit 110 on the monitor 170 (step S101). Subsequently, the imaging device 100 selects an image segmentation method that will be used in the photography assist process (step S102). Selection of the image segmentation method is performed by, for example, the image and signal processing unit 130. The image segmentation method is a segmentation method that has been empirically known as a balanced composition (for example, the rule of thirds or the like).

Figure 3:
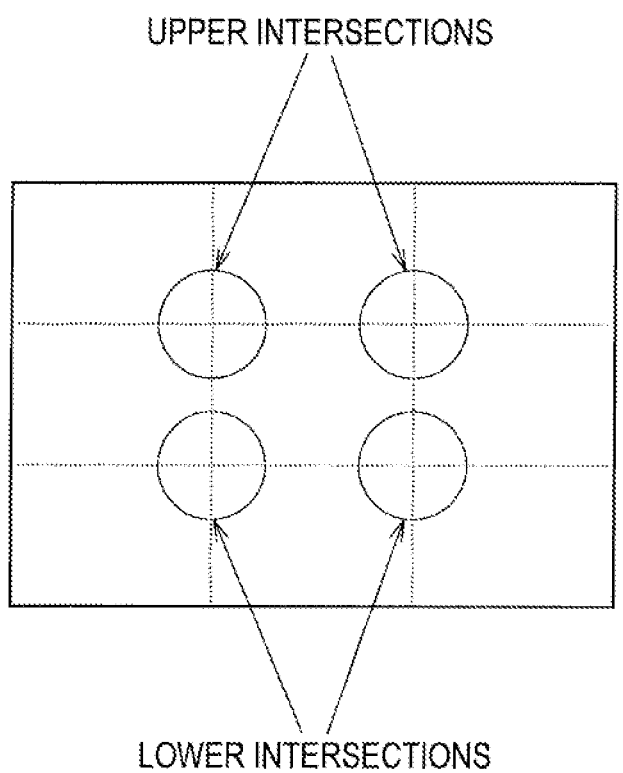
FIG. 3 is an explanatory diagram showing an example of an image segmentation method.

FIG. 3 is an explanatory diagram illustrating the rule of thirds as an example of an image segmentation method. In this embodiment, the rule of thirds is a segmentation method in which an image is divided into three even parts both vertically and horizontally each as shown in FIG. 3. The imaging device 100 according to this embodiment determines intersection points between respective vertical segmentation lines and respective horizontal segmentation lines shown in FIG. 3 as photography recommendation positions, selects a recommendation position for a subject from among the photography recommendation positions (four points in FIG. 3), and presents the selected recommendation position for a subject to the user.

When an image segmentation method is selected in step S102, the imaging device 100 subsequently performs a face detection process on the image data (image data displayed on the monitor 170) obtained from light focused by the lens unit 110 (step S103). The face detection process of step S103 is performed by, for example, the image and signal processing unit 130.

As the result of the face detection process of step S103, the imaging device 100 determines whether a face is included in the image data (step S104), and continues the face detection process until image data in which a face is included is obtained when no face is included in the image data. On the other hand, when the result of the face detection process of step S103 indicates that a face is included in the image data, the imaging device 100 calculates distances between a position of the detected face and respective intersections of segmentation lines based on the segmentation method selected in step S102 (step S105). The calculation process of step S105 is performed by, for example, the image and signal processing unit 130.

When the distances between the position of the detected face and the respective intersections of segmentation lines displayed on the monitor 170 are calculated in step S105, the imaging device 100 subsequently determines whether there is an intersection whose distance is a predetermined value A or less (step S106). The determination process of step S106 is performed by, for example, the image and signal processing unit 130.

When the determination result of step S106 indicates that there is no intersection whose distance is the predetermined value A or less, the imaging device 100 continues the calculation process of step S105 until an intersection whose distance is the predetermined value A or less appears. On the other hand, when the determination result of step S106 indicates that there are intersections whose distances are the predetermined value A or less, the imaging device 100 subsequently determines an intersection that is closest to the position of the face from among the intersections that are displayed on the monitor 170 and whose distances are the predetermined value A or less as a photography recommendation position, and displays a first guide mark at the intersection that is closest to the position of the face on the monitor 170 (step S107).

If the rule of thirds is employed as shown in FIG. 3, the imaging device 100 displays the first guide mark at an upper-right intersection when the intersection that is closest to the position of the face is the upper-right intersection, at a lower-right intersection when the intersection that is closest to the position of the face is the lower-right intersection, at an upper-left intersection when the intersection that is closest to the position of the face is the upper-left intersection, and at a lower-left intersection when the intersection that is closest to the position of the face is the lower-left intersection.

When the first guide mark is displayed on the monitor 170, the imaging device 100 subsequently calculates distances between the position of the detected face and the respective intersections of segmentation lines again in the segmentation method selected in step S102 (step S108). Then, the imaging device 100 determines whether there is an intersection whose distance is a predetermined value B (here, it is set to A>B) or less (step S109). The calculation process of step S108 and the determination process of step S109 are performed by, for example, the image and signal processing unit 130.

When the determination result of step S109 indicates that there is no intersection whose distance is the predetermined value B or less, the imaging device 100 continues the calculation process of step S108 until an intersection whose distance is the predetermined value B or less appears. On the other hand, when the determination result of step S109 indicates that there is an intersection whose distance is the predetermined value B or less, the imaging device 100 subsequently highlights the first guide mark displayed on the monitor 170 in step S107 (step S110). The highlight display process of step S110 is performed by, for example, the image and signal processing unit 130.

When the first guide mark displayed on the monitor 170 is highlighted in step S110, the imaging device 100 subsequently determines whether the position of the first guide mark displayed on the monitor 170 is on a lower intersection (step S111). The determination process of step S111 is performed by the image and signal processing unit 130. Here, a case in which the imaging device 100 employs the rule of thirds as shown in FIG. 3 is illustrated.

When the determination result of step S111 indicates that the position of the first guide mark displayed on the monitor 170 is on a lower intersection, the imaging device 100 displays a second guide mark on an upper intersection that is at a diagonal position to the first guide mark (step S112). On the other hand, when the determination result of step S111 indicates that the position of the first guide mark displayed on the monitor 170 is on an upper intersection, the imaging device 100 displays the second mark on another upper intersection that is at the same level as the first guide mark (step S113). When the rule of thirds is employed as shown in FIG. 3, there are only two intersections on each of the upper side and the lower side, and thus the imaging device 100 displays the second guide mark at an intersection that neighbors the intersection at which the first guide mark is displayed.

When the second guide mark is displayed on the monitor 170, the process of the imaging device 100 returns to step S103, and performs a face detection process of determining whether a face is included in image data generated by the image and signal processing unit 130. The user of the imaging device 100 can perform a photographic manipulation at an arbitrary point in time of the flowchart shown in FIG. 2, but can photograph a balanced image between a subject and a background by performing the photographic manipulation at a point in time when the imaging device 100 displays the second guide mark on the monitor 170 in step S112 or step S113.

Although FIG. 2 illustrates that the first guide mark is highlighted in step S110, and then the second guide mark is displayed in step S112 or step S113, the present disclosure is not limited to such an example. For example, highlighting of the first guide mark and display of the second guide mark may be performed at the same time, or highlighting of the first guide mark may be performed after display of the second guide mark.

The operation of the imaging device 100 illustrated in FIG. 2 will be described in further detail. FIG. 4A to FIG. 4F are explanatory diagrams showing examples of an image displayed on the monitor 170 of the imaging device 100, and show states in which image data obtained from light focused by the lens unit 110 is displayed on the monitor 170.

Figure 4A:
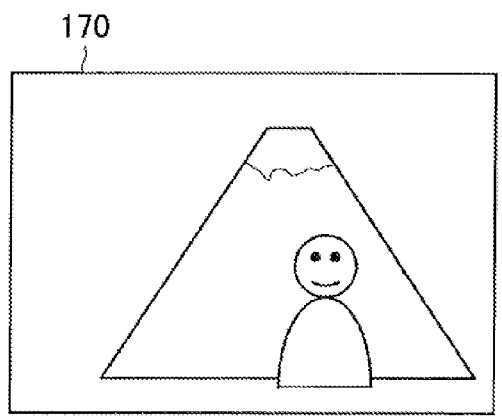
FIG. 4A is an explanatory diagram showing an example of an image displayed on a monitor.
Figure 4B:
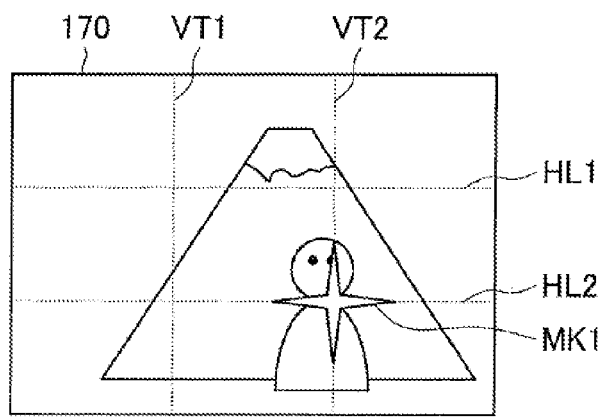
FIG. 4B is an explanatory diagram showing an example of an image displayed on the monitor.

A state of FIG. 4A is referred to as an initial composition state. This initial composition state is a state in which a user of the imaging device 100 has initially directed the lens unit 110 toward a subject. When the subject face detection process, the distance calculation process, and the first guide mark display process illustrated in FIG. 2 are performed by the imaging device 100 in this initial composition state, as shown in FIG. 4B, a first guide mark MK1 is displayed on an intersection of segmentation lines HL2 and VT2 that are the closest to a face of the subject in the monitor 170. FIG. 4B shows a state in which the first guide mark MK1 is displayed on a lower-right intersection. Here, segmentation lines HL1, HL2, VT1, and VT2 of a screen are shown as dotted lines in FIG. 4B and the subsequent drawings, but may not be displayed on the monitor 170.

Figure 4C:
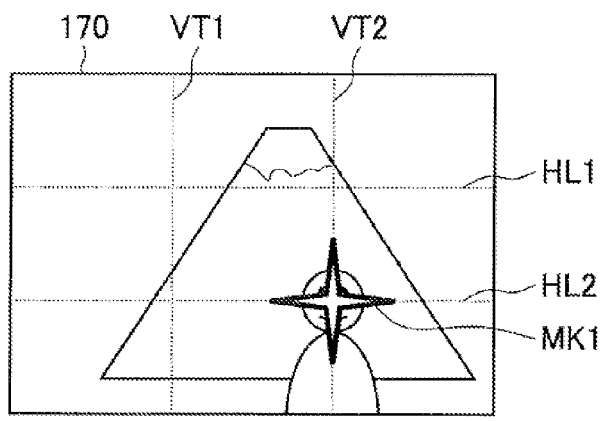
FIG. 4C is an explanatory diagram showing an example of an image displayed on the monitor.

When the first guide mark MK1 is displayed on the monitor 170, the user of the imaging device 100 moves the imaging device 100 to adjust the face of the subject to the first guide mark MK1, and thereby can dispose the person at a balanced position in an image. Also, when the user of the imaging device 100 moves the imaging device 100, and thereby a distance between the first guide mark MK1 and the face of the subject becomes the predetermined value B or less, as shown in FIG. 4C, the imaging device 100 highlights the first guide mark MK1 displayed on the monitor 170.

Figure 4D:
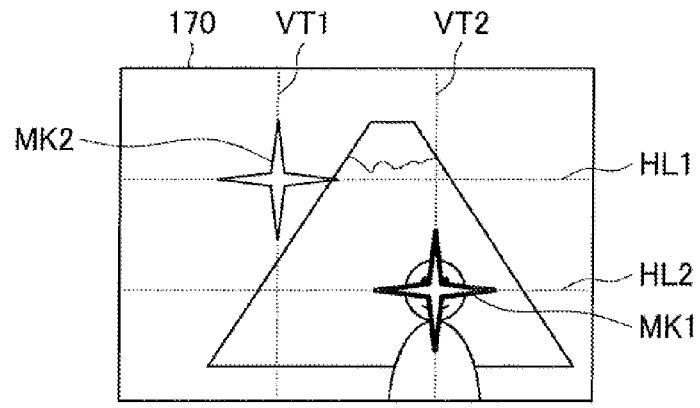
FIG. 4D is an explanatory diagram showing an example of an image displayed on the monitor.

When the first guide mark MK1 displayed on the monitor 170 is highlighted, as shown in FIG. 4D, the imaging device 100 further displays a second guide mark MK2 indicating a recommendation position for a background on an intersection that is at a diagonal position to the intersection at which the first guide mark MK1 is displayed.

Figure 4E:
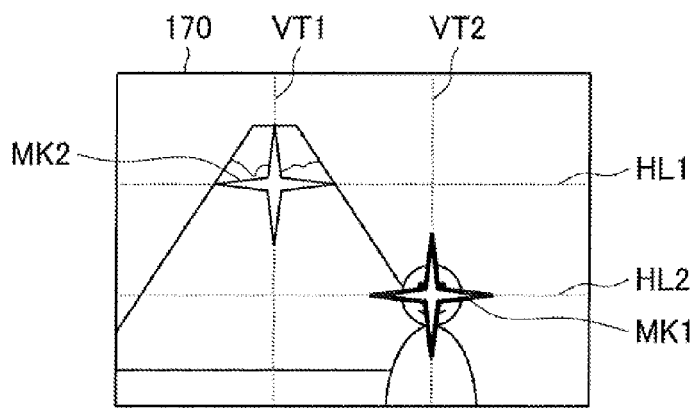
FIG. 4E is an explanatory diagram showing an example of an image displayed on the monitor.

When the second guide mark MK2 is displayed on the monitor 170, the user of the imaging device 100 moves the imaging device 100 to adjust the background to the second guide mark MK2, and thereby can dispose the background at a balanced position in an image. FIG. 4E shows a state in which the face of the subject is disposed at the first guide mark MK1, and a mountain of the background is disposed at the second guide mark MK2.

Figure 4F:
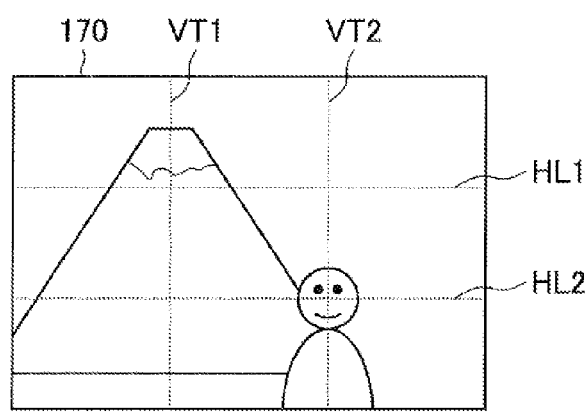
FIG. 4F is an explanatory diagram showing an example of an image displayed on the monitor.

When the user of the imaging device 100 presses a shutter button at a place at which the user of the imaging device 100 has set up the imaging device 100 to obtain image data as shown in FIG. 4E, it is possible to photograph an image in which there is a balance between the person and the background as shown in FIG. 4F. Here, it is needless to say that shapes of the first guide mark MK1 and the second guide mark MK2 are not limited to those shown in the drawings. The shape of the first guide mark MK1 and the shape of the second guide mark MK2 may be the same shape as shown in the drawings, or different shapes.

FIG. 4A to FIG. 4F show a case in which the intersection at which the first guide mark MK1 is displayed is a lower intersection. When the intersection at which the first guide mark MK1 is displayed is an upper intersection, the imaging device 100 displays the second guide mark MK2 at the same level as the intersection at which the first guide mark MK1 is displayed.

FIG. 5A to FIG. 5F are explanatory diagrams showing examples of an image displayed on the monitor 170 of the imaging device 100, and show states in which image data obtained from light focused by the lens unit 110 is displayed on the monitor 170.

Figure 5A:
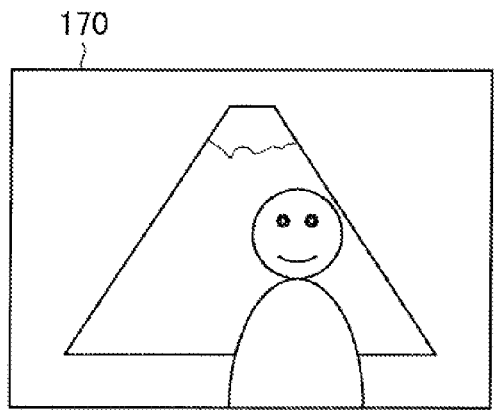
FIG. 5A is an explanatory diagram showing an example of an image displayed on the monitor.
Figure 5B:
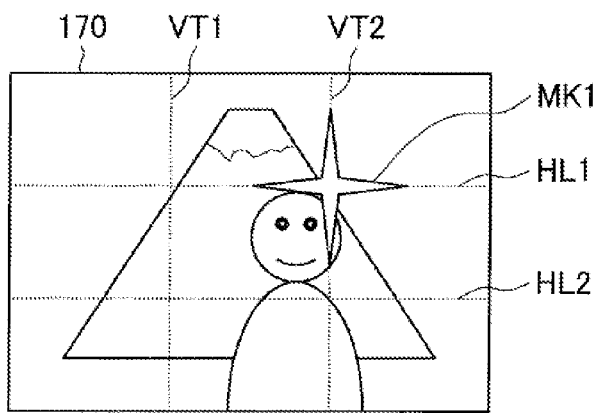
FIG. 5B is an explanatory diagram showing an example of an image displayed on the monitor.

A state of FIG. 5A is referred to as an initial composition state. This initial composition state is a state in which a user of the imaging device 100 has initially directed the lens unit 110 toward a subject. When the subject face detection process, the distance calculation process, and the first guide mark display process illustrated in FIG. 2 are performed by the imaging device 100 in this initial composition state, as shown in FIG. 5B, a first guide mark MK1 is displayed on an intersection of segmentation lines that are the closest to a face of the subject in the monitor 170. FIG. 5B shows a state in which the first guide mark MK1 is displayed on an upper-right intersection. Here, segmentation lines of a screen are shown as dotted lines in FIG. 5B and the subsequent drawings, but may not be displayed on the monitor 170.

Figure 5C:
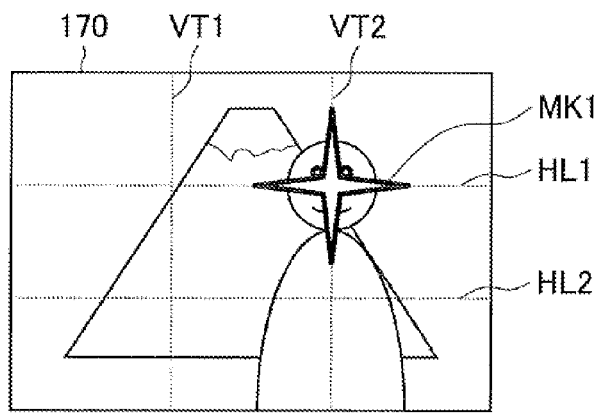
FIG. 5C is an explanatory diagram showing an example of an image displayed on the monitor.

When the first guide mark MK1 is displayed on the monitor 170, the user of the imaging device 100 moves the imaging device 100 to adjust the face of the subject to the first guide mark MK1, and thereby can dispose the person at a balanced position in an image. Also, when the user of the imaging device 100 moves the imaging device 100, and thereby a distance between the first guide mark MK1 and the face of the subject becomes the predetermined value B or less, as shown in FIG. 5C, the imaging device 100 highlights the first guide mark MK1 displayed on the monitor 170.

Figure 5D:
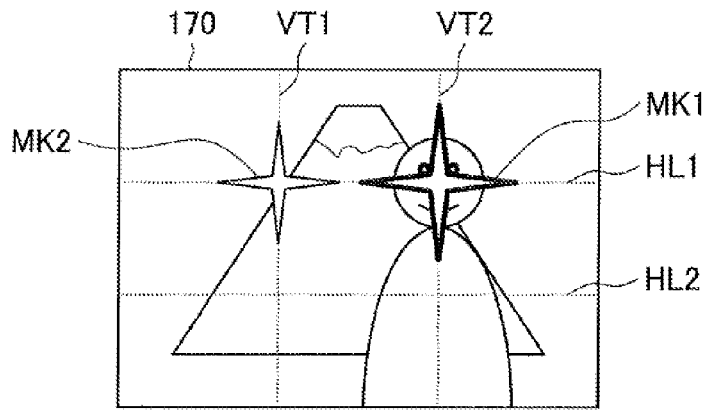
FIG. 5D is an explanatory diagram showing an example of an image displayed on the monitor.

When the first guide mark MK1 displayed on the monitor 170 is highlighted, as shown in FIG. 5D, the imaging device 100 further displays a second guide mark MK2 indicating a recommendation position for a background on another intersection at the same level as the intersection at which the first guide mark MK1 is displayed.

Figure 5E:
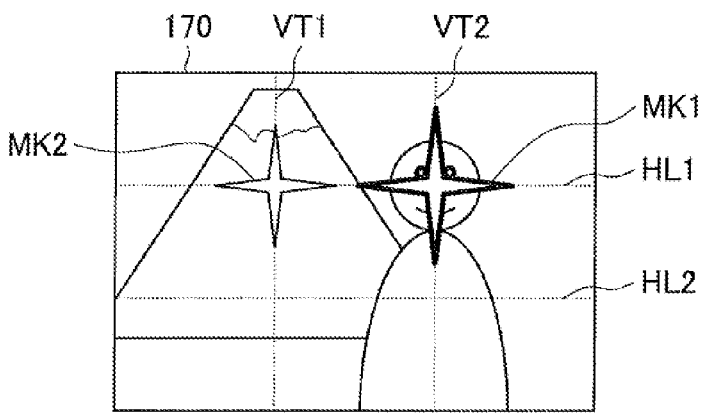
FIG. 5E is an explanatory diagram showing an example of an image displayed on the monitor.

When the second guide mark MK2 is displayed on the monitor 170, the user of the imaging device 100 moves the imaging device 100 to adjust the background to the second guide mark MK2, and thereby can dispose the background at a balanced position in an image. FIG. 5E shows a state in which the face of the subject is disposed at the first guide mark MK1, and a mountain of the background is disposed at the second guide mark MK2.

Figure 5F:
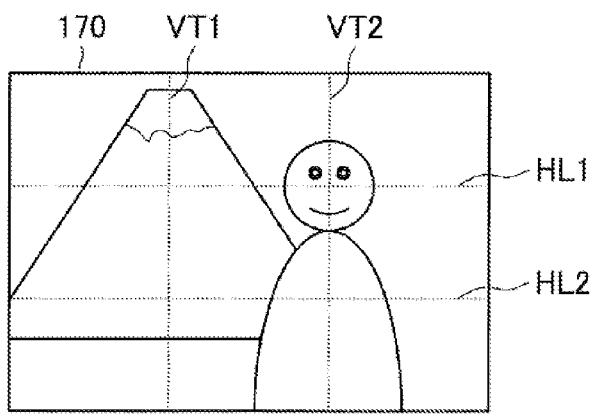
FIG. 5F is an explanatory diagram showing an example of an image displayed on the monitor.

When the user of the imaging device 100 presses a shutter button installed in the manipulation unit 160 at a place at which the user of the imaging device 100 has set up the imaging device 100 to obtain image data as shown in FIG. 5E, it is possible to photograph an image in which there is a balance between the person and the background as shown in FIG. 5F.

In this way, by displaying the first guide mark MK1 and the second guide mark MK2 according to intersections that are close to a position of a face of a subject in an initial composition state, the imaging device 100 can present the guide marks to the user to create an appropriate composition regardless of the initial composition state.

There is a case in which a user of the imaging device 100 moves the imaging device 100 after the first guide mark MK1 is displayed on the monitor 170, and a display condition of the first guide mark MK1 is not satisfied. Operation of the imaging device 100 in which such a case is taken into consideration will be described.

Figure 6:
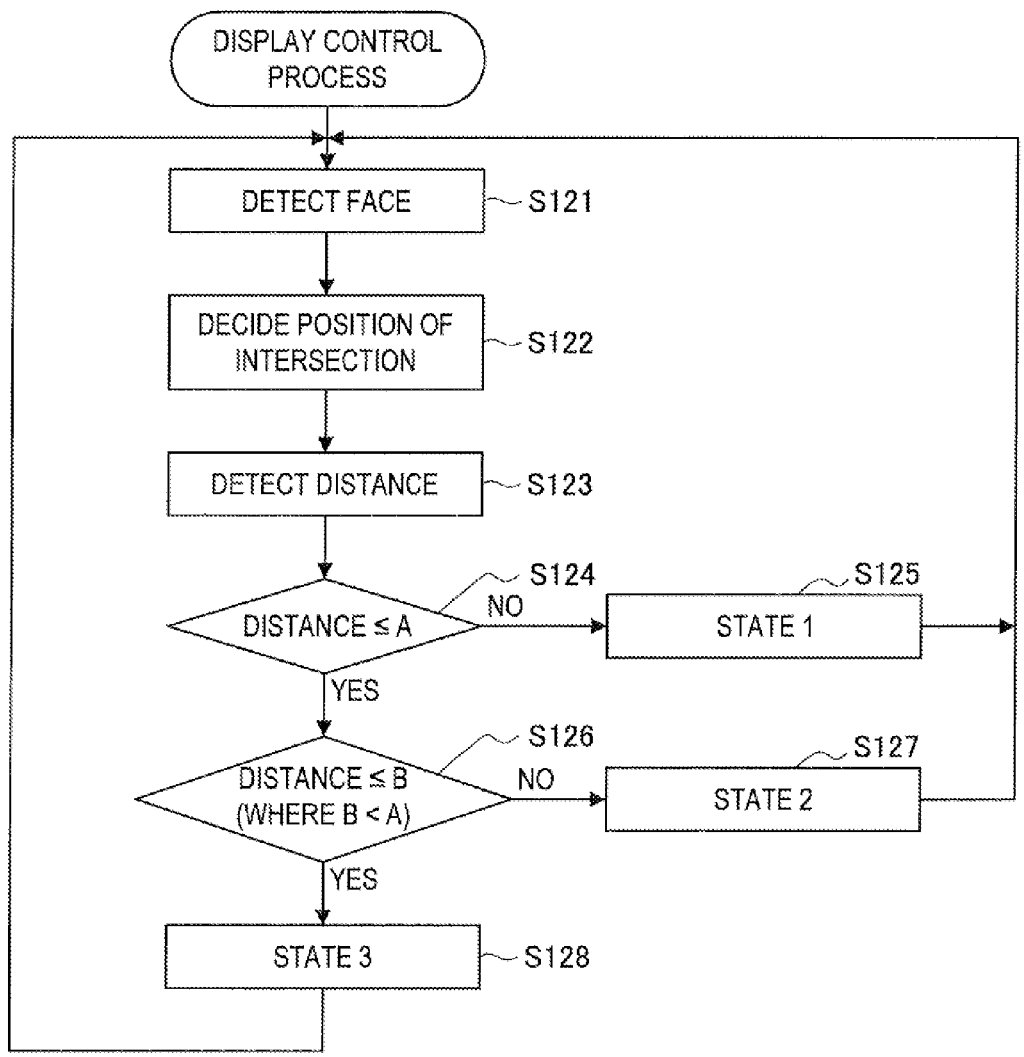
FIG. 6 is a flowchart illustrating operation of the imaging device related to an embodiment of the present disclosure.

FIG. 6 is a flowchart illustrating operation of the imaging device 100 according to an embodiment of the present disclosure. The flowchart shown in FIG. 6 illustrates operation of the imaging device 100 specialized in a display control process of the first guide mark MK1 and the second guide mark MK2. Operation of the imaging device 100 according to an embodiment of the present disclosure will be described below with reference to FIG. 6.

The imaging device 100 performs a face detection process on image data (image data displayed on the monitor 170) obtained from light focused by the lens unit 110 (step S121). When a face is included in the image data, the imaging device 100 decides a position of an intersection of segmentation lines that are the closest to a position of the face (step S122), and detects a distance between the position of the face and the intersection (step S123). The distance detection process of step S123 is performed by, for example, the image and signal processing unit 130.

Subsequently, the imaging device 100 determines whether the distance detected in step S123 is the predetermined value A or less (step S124). The determination process of step S124 is performed by, for example, the image and signal processing unit 130. When the determination result of step S124 indicates that the distance detected in step S123 is not the predetermined value A or less, the imaging device 100 displays no first guide mark on the monitor 170 (step S125). Here, a state in which no first guide mark is displayed is referred to as "state 1."

On the other hand, when the determination result of step S124 indicates that the distance detected in step S123 is the predetermined value A or less, the imaging device 100 subsequently determines whether the distance detected in step S123 is the predetermined value B or less (here, B<A) (step S126). The determination process of step S126 is performed by, for example, the image and signal processing unit 130. When the determination result of step S126 indicates that the distance detected in step S123 is the predetermined value A or less but is not the value B or less, the imaging device 100 displays a first guide mark on the monitor 170 (step S127). Here, a state in which a first guide mark is displayed is referred to as "state 2."

On the other hand, when the determination result of step S126 indicates that the distance detected in step S123 is the value B or less, the imaging device 100 displays a first guide mark on the monitor 170, and then highlights the first guide mark and displays a second guide mark at a predetermined position (step S128). Here, a state in which a first guide mark is highlighted and a second guide mark is displayed is referred to as "state 3."

The imaging device 100 performs face detection and distance detection on the image data obtained from light focused by the lens unit 110 at intervals of each frame or predetermined frames, and performs display control for the monitor 170 while switching from any one of state 1 to state 3.

Thus far, the description has been made regarding operation of the imaging device 100 when only one face is included in image data obtained from light focused by the lens unit 110. Next, description will be made regarding operation of the imaging device 100 when a plurality of faces are included in image data obtained from light focused by the lens unit 110.

Figure 7A:
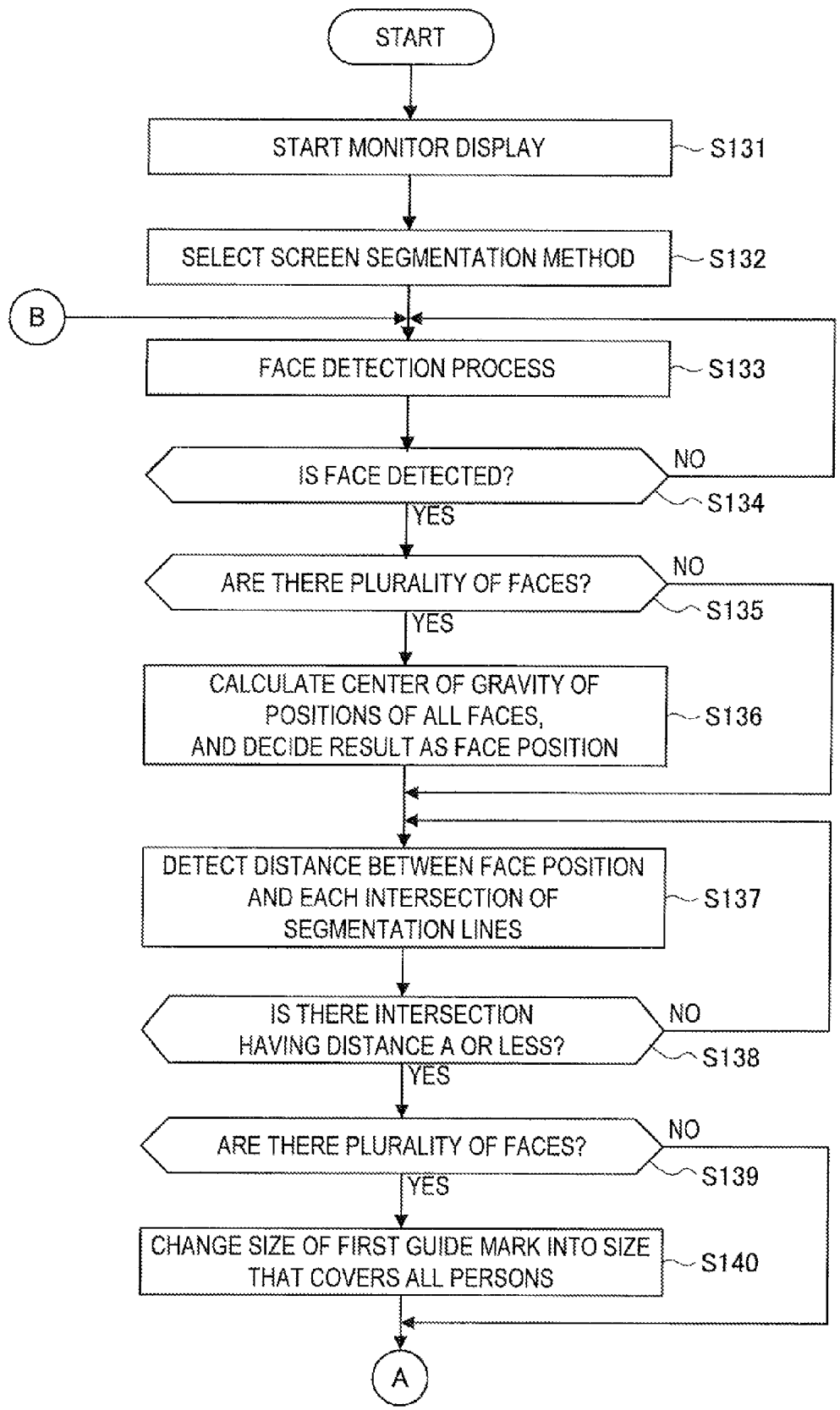
FIG. 7A is a flowchart illustrating operation of the imaging device related to an embodiment of the present disclosure.
Figure 7B:
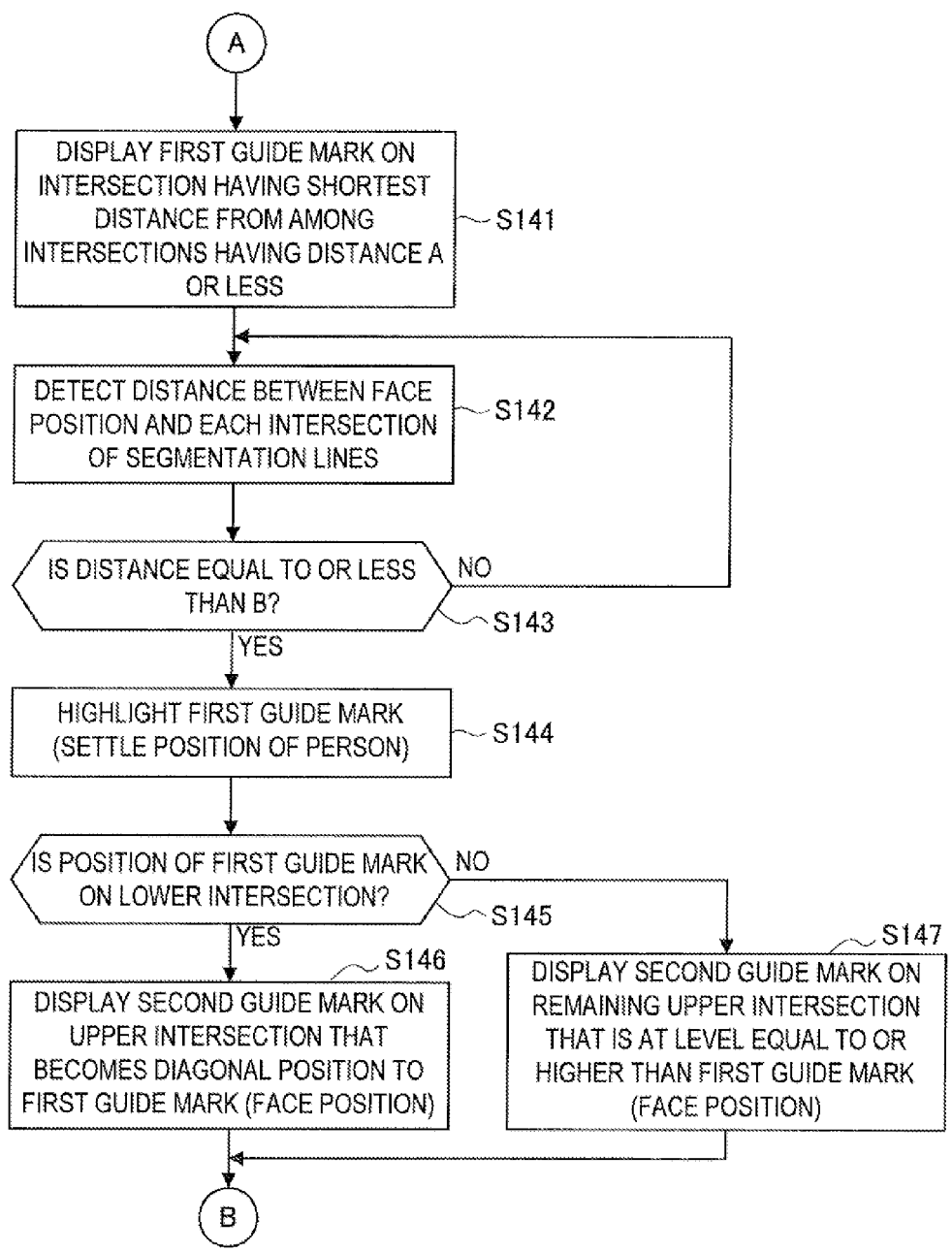
FIG. 7B is a flowchart illustrating operation of the imaging device related to an embodiment of the present disclosure.

FIG. 7A and FIG. 7B are flowcharts illustrating operation of the imaging device 100 related to an embodiment of the present disclosure. The flowcharts shown in FIG. 7A and FIG. 7B illustrate a photography assist process when an image is photographed using the imaging device 100, and basic operation is the same as the flowchart shown in FIG. 2. With reference to FIG. 7A and FIG. 7B, operation of the imaging device 100 related to an embodiment of the present disclosure will be described below.

Like the operation of the imaging device 100 illustrated in FIG. 2, the imaging device 100 first starts to display image data obtained from light focused by the lens unit 110 on the monitor 170 when the imaging device 100 performs a photography assist process (step S131). Subsequently, the imaging device 100 selects an image segmentation method that will be used in the photography assist process (step S132). Selection of the image segmentation method is performed by, for example, the image and signal processing unit 130.

When an image segmentation method is selected in step S132, the imaging device 100 subsequently performs a face detection process on the image data (image data displayed on the monitor 170) obtained from light focused by the lens unit 110 (step S133). The face detection process of step S133 is performed by, for example, the image and signal processing unit 130.

As the result of the face detection process of step S133, the imaging device 100 determines whether a face is included in the image data (step S134), and continues the face detection process until image data in which a face is included is obtained when no face is included in the image data. On the other hand, when the result of the face detection process of step S133 indicates that a face is included in the image data, the imaging device 100 subsequently determines whether a plurality of faces are in the image data (step S135).

When the determination result of step S135 indicates that a plurality of faces are in the image data, the imaging device 100 calculates a center of gravity of positions of the plurality of faces, and decides the result as a face position (step S136). The process of step S136 is performed by, for example, the image and signal processing unit 130. On the other hand, when the determination result of step S135 indicates that only one face is in the image data, the process of step S136 is skipped.

Subsequently, the imaging device 100 calculates distances between the detected or decided face position and respective intersections of segmentation lines based on the segmentation method selected in step S132 (step S137). The calculation process of step S137 is performed by, for example, the image and signal processing unit 130.

When the distances between the detected or decided face position and the respective intersections of segmentation lines displayed on the monitor 170 are calculated in step S137, the imaging device 100 subsequently determines whether there is an intersection whose distance is the predetermined value A or less (step S138). The determination process of step S138 is performed by, for example, the image and signal processing unit 130.

When the determination result of step S138 indicates that there is no intersection whose distance is the predetermined value A or less, the imaging device 100 continues the calculation process of step S137 until an intersection whose distance is the predetermined value A or less appears. On the other hand, when the determination result of step S138 indicates that there are intersections whose distances are the predetermined value A or less, the imaging device 100 subsequently determines whether a plurality of faces are in the image data (step S139).

When the determination result of step S139 indicates that a plurality of faces are in the image data, the imaging device 100 changes a display size of a first guide mark into a size that covers all the faces (step S140). The process of step S140 is performed by, for example, the image and signal processing unit 130. On the other hand, when the determination result of step S139 indicates that only one face is in the image data, the process of step S140 is skipped.

Subsequently, the imaging device 100 displays a first guide mark on an intersection that is closest to the face position among the intersections that are displayed on the monitor 170 and whose distances are the predetermined value A or less (step S141).

The subsequent process is basically the same as the process of the imaging device 100 illustrated in FIG. 2. When the first guide mark is displayed on the monitor 170, the imaging device 100 subsequently calculates distances between the detected or decided face position and the respective intersections of segmentation lines again based on the segmentation method selected in step S132 (step S142). Then, the imaging device 100 determines whether there is an intersection whose distance is the predetermined value B (where A>B) or less (step S143).

When the determination result of step S143 indicates that there is no intersection whose distance is the predetermined value B or less, the imaging device 100 continues the calculation process of step S142 until an intersection whose distance is the predetermined value B or less appears. On the other hand, when the determination result of step S143 indicates that there are intersections whose distances are the predetermined value B or less, the imaging device 100 subsequently highlights the first guide mark displayed on the monitor 170 in step S141 (step S144).

When the first guide mark displayed on the monitor 170 is highlighted in step S144, the imaging device 100 subsequently determines whether the position of the first guide mark displayed on the monitor 170 is on a lower intersection (step S145).

When the determination result of step S145 indicates that the position of the first guide mark displayed on the monitor 170 is on a lower intersection, the imaging device 100 displays a second guide mark on an upper intersection that is at a diagonal position to the first guide mark (step S146). On the other hand, when the determination result of step S145 indicates that the position of the first guide mark displayed on the monitor 170 is on an upper intersection, the imaging device 100 displays the second mark on another upper intersection that is at the same level as the first guide mark (step S147).

When the second guide mark is displayed on the monitor 170, the process of imaging device 100 returns to step S133, and performs a face detection process of determining whether a face is included in image data generated by the image data image and signal processing unit 130. A user of the imaging device 100 can perform a photographic manipulation at an arbitrary point in time of the flowcharts illustrated in FIG. 7A and FIG. 7B, or can photograph a balanced image between a subject and a background by performing the photographic manipulation at a point in time when the imaging device 100 displays the second guide mark on the monitor 170 in step S146 or step S147.

Although FIG. 7A and FIG. 7B illustrate that the first guide mark is highlighted in step S144, and then the second guide mark is displayed in step S146 or step S147, the present disclosure is not limited to such an example. For example, highlighting of the first guide mark and display of the second guide mark may be performed at the same time, or highlighting of the first guide mark may be performed after display of the second guide mark.

Figure 8A:
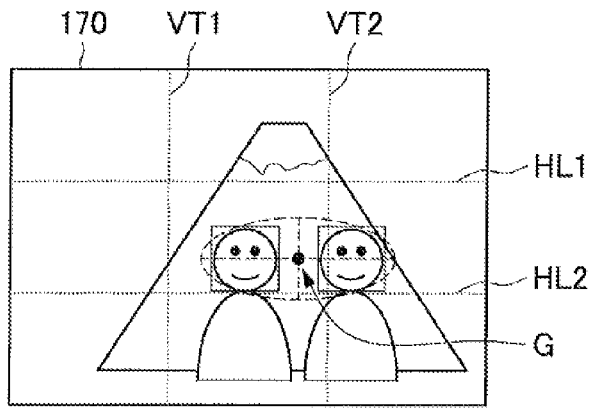
FIG. 8A is an explanatory diagram showing an example of an image displayed on the monitor.
Figure 8B:
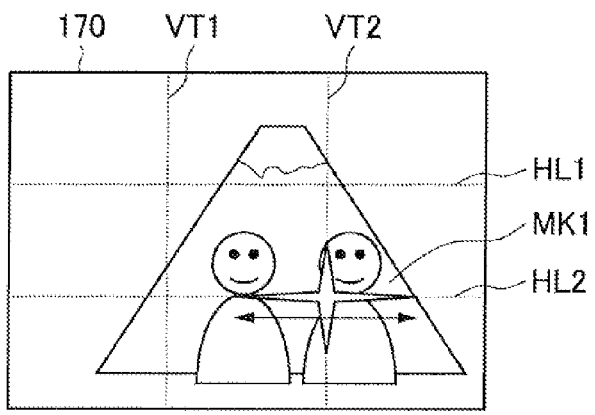
FIG. 8B is an explanatory diagram showing an example of an image displayed on the monitor.
Figure 8C:
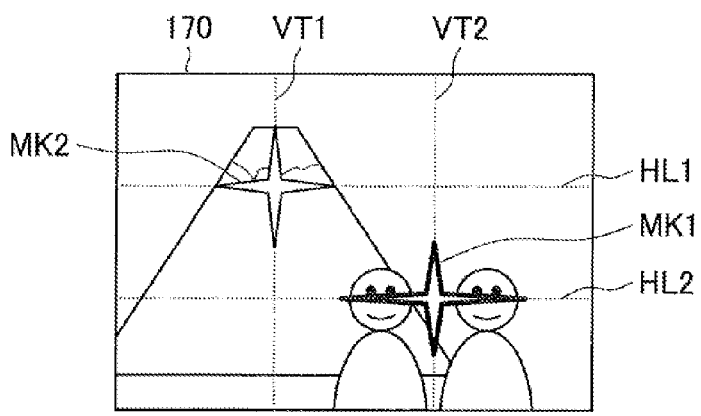
FIG. 8C is an explanatory diagram showing an example of an image displayed on the monitor.

The operation of the imaging device 100 illustrated in FIG. 7A and FIG. 7B will be described in further detail. FIG. 8A to FIG. 8C are explanatory diagrams showing examples of an image displayed on the monitor 170 of the imaging device 100, and show states in which image data obtained from light focused by the lens unit 110 is displayed on the monitor 170. Also, FIG. 8A to FIG. 8C illustrate operation of the imaging device 100 when two persons are shown.

First, the imaging device 100 performs a face detection process and a person number detection process, thereby detecting how many persons are included in image data. FIG. 8A shows a state in which two persons are shown in image data obtained from light focused by the lens unit 110. When the imaging device 100 detects that two persons are included in image data, the imaging device 100 decides a center of gravity G of faces of the two persons as a face position. After that, as shown in FIG. 8B, the imaging device 100 displays a first guide mark MK1 at an intersection of segmentation lines that are the closest to the decided face position, and also changes a size of the first guide mark MK1 with a size that covers the faces of the two persons.

When the first guide mark MK1 is displayed on the monitor 170, and the imaging device 100 is moved by a user to adjust the face to the first guide mark MK1, as shown in FIG. 8C, the imaging device 100 highlights the first guide mark MK1, and also displays a second guide mark MK2 at a predetermined position on the monitor 170.

In this way, when a plurality of persons are shown, the imaging device 100 can display the first guide mark MK1 and the second guide mark MK2 on the monitor 170 by deciding a center of gravity of faces as a face position.

FIG. 8A to FIG. 8C show a case in which two persons are shown, which is the same as a case in which three or more persons are shown. However, when the number of persons increases, and a center of gravity of faces is simply decided as a face position, the balance of composition may rather deteriorate, or there may be a person who has not been completely included in an image. In consideration of such cases, when a plurality of persons, particularly three or more persons, are shown, a center of gravity of faces may be decided according to weighting.

Figure 9A:
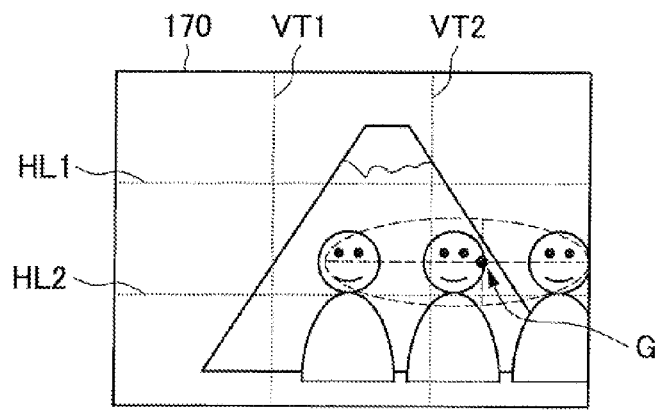
FIG. 9A is an explanatory diagram showing an example of an image displayed on the monitor.
Figure 9B:
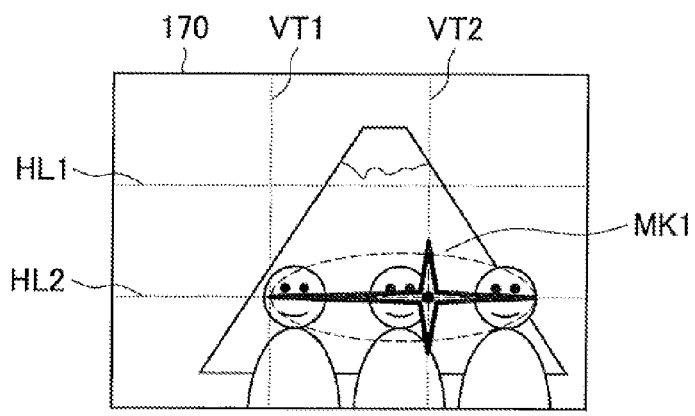
FIG. 9B is an explanatory diagram showing an example of an image displayed on the monitor.
Figure 9C:
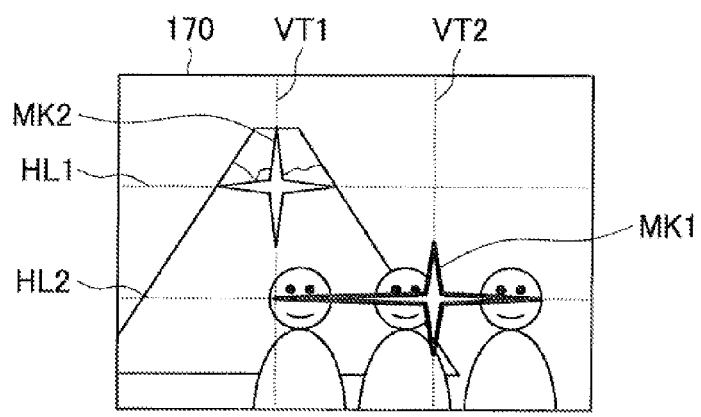
FIG. 9C is an explanatory diagram showing an example of an image displayed on the monitor.

FIG. 9A to FIG. 9C are explanatory diagrams showing examples of an image displayed on the monitor 170 of the imaging device 100, and show states in which image data obtained from light focused by the lens unit 110 is displayed on the monitor 170. Also, FIG. 9A to FIG. 9C illustrate operation of the imaging device 100 when three persons are shown.

FIG. 9A shows a state in which three persons are included in image data obtained from light focused by the lens unit 110. When a center of gravity of faces of the three persons is decided as a face position as described above, a position of the face of a middle person among the three persons approximately becomes a center of gravity of the faces of the three persons. However, when the position of the face of the middle person is decided as the face position, a person on the right side is pushed out of the image.

Accordingly, in such a case, the imaging device 100 decides a center of gravity G that has been weighted on the right side as the face position as shown in FIG. 9A so that the three persons are included in the image. After that, as shown in FIG. 9B, the imaging device 100 changes a size of a first guide mark MK1 with a size that covers the faces of the three persons, and displays the first guide mark MK1 at an intersection of segmentation lines that are the closest to the decided face position. Also, in the present disclosure, the imaging device 100 may display the first guide mark MK1 at the intersection of the segmentation lines that are the closest to the decided face position as shown in FIG. 8B, and then change the size of the first guide mark MK1 with the size that covers the faces of the three persons.

When the first guide mark MK1 is displayed on the monitor 170 as shown in FIG. 9B and the imaging device 100 is moved by a user to adjust the face position to the first guide mark MK1, as shown in FIG. 9C, the imaging device 100 highlights the first guide mark MK1, and also displays a second guide mark MK2 at a predetermined position on the monitor 170. In this way, the imaging device 100 can assist photography with a balanced composition even when three persons are shown.

Figure 10A:
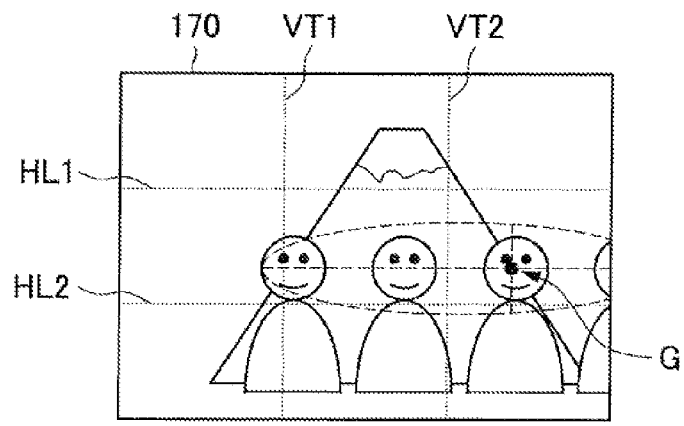
FIG. 10A is an explanatory diagram showing an example of an image displayed on the monitor.
Figure 10B:
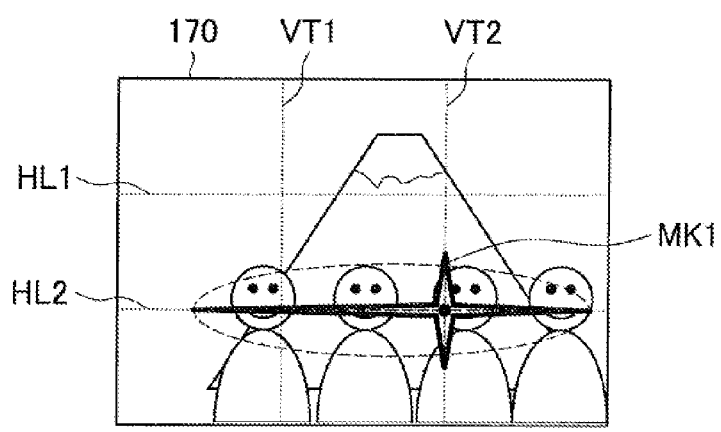
FIG. 10B is an explanatory diagram showing an example of an image displayed on the monitor.
Figure 10C:
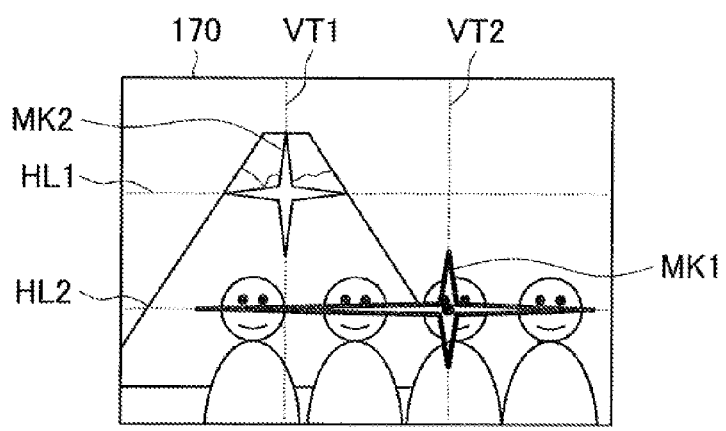
FIG. 10C is an explanatory diagram showing an example of an image displayed on the monitor.

Even when four persons are shown, the imaging device 100 can display the first guide mark MK1 and the second guide mark MK2 on the monitor 170 using the same process. FIG. 10A to FIG. 10C are explanatory diagrams showing examples of an image displayed on the monitor 170 of the imaging device 100, and show states in which image data obtained from light focused by the lens unit 110 is displayed on the monitor 170. Also, FIG. 10A to FIG. 10C illustrate operation of the imaging device 100 when four persons are shown.

FIG. 10A shows a state in which four persons are included in image data obtained from light focused by the lens unit 110. When a center of gravity of faces of the four persons is decided as a face position as described above, a middle position of the face of a second person on the left side and the face of a second person on the right side among the four persons approximately becomes a center of gravity of the faces of the four persons. However, when the position is decided as the face position, a person on the right side among the four persons is pushed out of the image.

Accordingly, in this case, the imaging device 100 decides a center of gravity G that has been weighted on the right side as the face position as shown in FIG. 10A so that the four persons are included in the image. The center of gravity G is further weighted on the right side than the center of gravity G shown in FIG. 9A. After that, as shown in FIG. 10B, the imaging device 100 changes a size of a first guide mark MK1 with a size that covers the faces of the four persons, and displays the first guide mark MK1 at an intersection of segmentation lines that are the closest to the decided face position. Also, in the present disclosure, the imaging device 100 may display the first guide mark MK1 at the intersection of the segmentation lines that are the closest to the decided face position as shown in FIG. 8B, and then change the size of the first guide mark MK1 with the size that covers the faces of the four persons.

When the first guide mark MK1 is displayed on the monitor 170 as shown in FIG. 10B and the imaging device 100 is moved by a user to adjust the face position to the first guide mark MK1, as shown in FIG. 10C, the imaging device 100 highlights the first guide mark MK1, and also displays a second guide mark MK2 at a predetermined position on the monitor 170. In this way, the imaging device 100 can assist photography with a balanced composition even when four persons are shown.

FIG. 9A to FIG. 9C and FIG. 10A to FIG. 10C show operation of the imaging device 100 in a state in which persons stand abreast. However, for example, when persons stand in file, a composition in which no one is pushed out of a screen may be obtained even if a center of gravity of faces is decided as a face position. Accordingly, when a plurality of persons are shown, the imaging device 100 calculates a center of gravity of faces first, and decides the center of gravity as a face position. Then, when someone is pushed out of a screen, the imaging device 100 may decide the face position by weighting as described above.

FIG. 9A to FIG. 9C and FIG. 10A to FIG. 10C show operation of the imaging device 100 in a state in which persons stand abreast, but for example, when persons stand in file, a child may stand in front of an adult. In consideration of such a case, the imaging device 100 may determine whether a person shown in the front row is a child, and cause a position of the face of the child to be set as a first photography recommendation position when a child is shown in the front row.

<2. Conclusion>

As described above, in photographing an image, the imaging device 100 according to an embodiment of the present disclosure sets a plurality of photography recommendation positions at which a balanced composition is obtained, performs a face detection process, decides a photography recommendation position that is closest to a detected face position as a first photography recommendation position, and displays a mark. As described above, the photography recommendation position is, for example, an intersection of segmentation lines for segmenting an image at equal intervals.

When a distance between the position of a face included in image data and the first photography recommendation position becomes a predetermined distance or less, the imaging device 100 decides an appropriate photography recommendation position for disposing a background as a second photography recommendation position, and displays a mark. A user who photographs an image using the imaging device 100 according to an embodiment of the present disclosure photographs by adjusting a face or a background to a mark displayed on the monitor 170, so that photography with a balanced composition between a subject such as a person or the like and the background is facilitated.

Also, when there are a plurality of detected faces, the imaging device 100 according to an embodiment of the present disclosure decides a center of gravity of the faces as a face position, but changes a size of a mark displayed at a first photography recommendation position according to the number of detected faces, or performs weighting for decision of a face position. In this way, the imaging device 100 according to an embodiment of the present disclosure can provide photography with a balanced composition to a user while preventing someone from being pushed out of a screen.

In addition, the above-described operation of the imaging device 100 according to an embodiment of the present disclosure may be performed by hardware or software. When the operation is performed by software, for example, the CPU 140 may read a computer program stored in a recording medium, such as a ROM or the like, installed in the imaging device 100, and run the read computer program in sequence to perform the operation.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

As an example, in the embodiment, the number of segments is determined in advance, and a guide mark is displayed on an intersection of vertical and horizontal segmentation lines, but the present disclosure is not limited to such an example. For example, the imaging device 100 may change the number of segments according to the number of recognized faces. More specifically, the imaging device 100 may employ, for example, the rule of thirds when the number of faces is one, the rule of fifths when the number of faces is two, and the like, thereby changing the number of segments according to the number of recognized faces. By changing the number of segments according to the number of recognized faces, it is possible to expect an effect of enabling a more balanced image to be photographed.

As another example, the imaging device 100 according to the embodiment of the present disclosure first recognizes the face of a person as a subject and decides a recommended photography position for the person, but the present disclosure is not limited to such an example. For example, the imaging device 100 may be caused to learn an object in advance, and when the learned object is included in image data, the imaging device 100 may be caused to decide a recommended photography position for the object and display a guide mark on a monitor.

Additionally, the present technology may also be configured as below.

(1) An imaging device including:
a control unit that performs subject recognition,
wherein the control unit recognizes a first subject, decides a first subject recommendation position for the first subject in a screen from among a plurality of subject recommendation positions, displays a first specific display object at the decided first subject recommendation position,
determines whether a distance between a position of the first subject and the first subject recommendation position is within a predetermined value, and decides a second subject recommendation position for a second subject in the screen from among the plurality of subject recommendation positions and displays a second specific display object at the second subject recommendation position when the distance is within the predetermined value.

(2) The imaging device according to (1),
wherein, when the distance between the position of the first subject and the first subject recommendation position is within the predetermined value, the control unit causes the first specific display object to be highlighted.

(3) The imaging device according to (1) or (2),
wherein, when a plurality of persons are detected as first subjects, the control unit decides a center of gravity of the plurality of persons as the first subject recommendation position.

(4) The imaging device according to (1) or (2),
wherein, when a plurality of persons are detected as first subjects, the control unit performs weighting according to a number of the detected persons to decide the first subject recommendation position.

(5) The imaging device according to (4),
wherein the control unit changes the weighting according to the number of detected persons.

(6) The imaging device according to any one of (1) to (5),
wherein the control unit causes the second subject recommendation position to be displayed above the first subject recommendation position.

(7) The imaging device according to any one of (1) to (6),
wherein the control unit changes a size of the first specific display object according to a number of persons detected as first subjects.

(8) The imaging device according to any one of (1) to (7),
wherein the control unit sets the first subject recommendation position and the second subject recommendation position on an intersection of segmentation lines for segmenting a screen at equal intervals both vertically and horizontally.

(9) The imaging device according to (8),
wherein the control unit changes a number of segments of a screen according to a number of persons detected as first subjects.

(10) A method for controlling an imaging device including:
recognizing a first subject;
deciding a first subject recommendation position for the first subject in a screen from among a plurality of subject recommendation positions to displaying a first specific display object at the first subject recommendation position;
determining whether a distance between a position of the first subject and the first subject recommendation position is within a predetermined value; and
when the distance is within the predetermined value, deciding a second subject recommendation position for a second subject in the screen from among the plurality of subject recommendation positions to display a second specific display object at the second subject recommendation position.

(11) A computer program for causing a computer to perform:

recognizing a first subject;

deciding a first subject recommendation position for the first subject in a screen from among a plurality of subject recommendation positions to display a first specific display object at the first subject recommendation position;

determining whether a distance between a position of the first subject and the first subject recommendation position is within a predetermined value; and when the distance is within the predetermined value, deciding a second subject recommendation position for a second subject in the screen from among the plurality of subject recommendation positions to display a second specific display object at the second subject recommendation position.

What is claimed is:

1. An imaging device comprising:
a processor; and
a memory having a program stored thereon which when executed by the processor causes the processor to perform subject recognition processing on a received signal which represents an image,
wherein the subject recognition processing includes processing to (i) recognize a first subject, (ii) decide a first subject recommendation position for the first subject in a screen from among a plurality of subject recommendation positions, (iii) cause a first specific display object to be displayed at the decided first subject recommendation position, (iv) determine whether a distance between a position of the first subject and the first subject recommendation position is within a predetermined value, (v) decide a second subject recommendation position for a second subject in the screen from among the plurality of subject recommendation positions and cause a second specific display object to be displayed at the second subject recommendation position when the distance is within the predetermined value, and (vi) when the distance between the position of the first subject and the first subject recommendation position is within the predetermined value, cause the first specific display object to be highlighted.

2. The imaging device according to claim 1,
wherein the processor when executing the program causes the second subject recommendation position to be displayed above the first subject recommendation position.

3. An imaging device comprising:
a processor; and
a memory having a program stored thereon which when executed by the processor causes the processor to perform subject recognition processing on a received signal which represents an image,
wherein the subject recognition processing includes processing to (i) recognize a first subject, (ii) decide a first subject recommendation position for the first subject in a screen from among a plurality of subject recommendation positions, (iii) cause a first specific display object to be displayed at the decided first subject recommendation position, (iv) determine whether a distance between a position of the first subject and the first subject recommendation position is within a predetermined value, (v) decide a second subject recommendation position for a second subject in the screen from among the plurality of subject recommendation positions and cause a second specific display object to be displayed at the second subject recommendation position when the distance is within the predetermined value, and (vi) when a plurality of persons are detected as first subjects, decide a center of gravity of the plurality of persons as the first subject recommendation position.

4. An imaging device comprising:
a processor; and
a memory having a program stored thereon which when executed by the processor causes the processor to perform subject recognition processing on a received signal which represents an image,
wherein the subject recognition processing includes processing to (i) recognize a first subject, (ii) decide a first subject recommendation position for the first subject in a screen from among a plurality of subject recommendation positions, (iii) cause a first specific display object to be displayed at the decided first subject recommendation position, (iv) determine whether a distance between a position of the first subject and the first subject recommendation position is within a predetermined value, (v) decide a second subject recommendation position for a second subject in the screen from among the plurality of subject recommendation positions and cause a second specific display object to be displayed at the second subject recommendation position when the distance is within the predetermined value, and (vi) when a plurality of persons are detected as first subjects, perform weighting according to a number of the detected persons to decide the first subject recommendation position.

5. The imaging device according to claim 4,
wherein the processor when executing the program changes the weighting according to the number of detected persons.

6. An imaging device comprising:
a processor; and
a memory having a program stored thereon which when executed by the processor causes the processor to perform subject recognition processing on a received signal which represents an image,
wherein the subject recognition processing includes processing to (i) recognize a first subject, (ii) decide a first subject recommendation position for the first subject in a screen from among a plurality of subject recommendation positions, (iii) cause a first specific display object to be displayed at the decided first subject recommendation position, (iv) determine whether a distance between a position of the first subject and the first subject recommendation position is within a predetermined value, (v) decide a second subject recommendation position for a second subject in the screen from among the plurality of subject recommendation positions and cause a second specific display object to be displayed at the second subject recommendation position when the distance is within the predetermined value, and (vi) change a size of the first specific display object according to a number of persons detected as first subjects.

7. An imaging device comprising:
a processor; and
a memory having a program stored thereon which when executed by the processor causes the processor to perform subject recognition processing on a received signal which represents an image,
wherein the subject recognition processing includes processing to (i) recognize a first subject, (ii) decide a first subject recommendation position for the first subject in a screen from among a plurality of subject recommendation positions, (iii) cause a first specific display object to be displayed at the decided first subject recommendation position, (iv) determine whether a distance between a position of the first subject and the first subject recommendation position is within a predetermined value, (v) decide a second subject recommendation position for a second subject in the screen from among the plurality of subject recommendation positions and cause a second specific display object to be displayed at the second subject recommendation position when the distance is within the predetermined value, and (vi) set the first subject recommendation position and the second subject recommendation position on an intersection of segmentation lines for segmenting a screen at equal intervals both vertically and horizontally.

8. The imaging device according to claim 7,
wherein the processor when executing the program changes a number of segments of a screen according to a number of persons detected as first subjects.

9. A method for controlling an imaging device comprising:
recognizing a first subject;
deciding a first subject recommendation position for the first subject in a screen from among a plurality of subject recommendation positions to displaying a first specific display object at the first subject recommendation position;
determining whether a distance between a position of the first subject and the first subject recommendation position is within a predetermined value; and
when the distance is within the predetermined value, deciding a second subject recommendation position for a second subject in the screen from among the plurality of subject recommendation positions to display a second specific display object at the second subject recommendation position,
wherein, when the distance between the position of the first subject and the first subject recommendation position is within the predetermined value, the first specific display object is highlighted.

10. A non-transitory computer readable recording medium having stored thereon a computer program for causing a computer to perform:
recognizing a first subject;
deciding a first subject recommendation position for the first subject in a screen from among a plurality of subject recommendation positions to display a first specific display object at the first subject recommendation position;
determining whether a distance between a position of the first subject and the first subject recommendation position is within a predetermined value; and
when the distance is within the predetermined value, deciding a second subject recommendation position for a second subject in the screen from among the plurality of subject recommendation positions to display a second specific display object at the second subject recommendation position,
wherein, when the distance between the position of the first subject and the first subject recommendation position is within the predetermined value, the first specific display object is highlighted.

* * * * *